United States Patent [19] [11] 4,230,242
Meshberg [45] Oct. 28, 1980

[54] TRIPLE SEAL VALVE MEMBER FOR AN ATOMIZING PUMP DISPENSER

[76] Inventor: Philip Meshberg, 2500 S. Ocean Blvd. Bldg. 3, Apt 1-A, Palm Beach, Fla. 33480

[21] Appl. No.: 24,070

[22] Filed: Mar. 26, 1979

[51] Int. Cl.³ .......... G01F 11/04
[52] U.S. Cl. .......... 222/321; 222/385
[58] Field of Search .......... 222/321, 380, 383, 385; 239/333, 329, 331

[56] References Cited

U.S. PATENT DOCUMENTS

| | | | |
|---|---|---|---|
| 3,062,416 | 11/1962 | Cooprider | 222/321 |
| 4,051,983 | 10/1977 | Anderson | 239/333 |
| 4,089,442 | 5/1978 | Hafele et al. | 222/321 |
| 4,140,249 | 2/1979 | Majima | 222/321 |

FOREIGN PATENT DOCUMENTS

| | | | |
|---|---|---|---|
| 2285815 | 4/1978 | France | 222/321 |

*Primary Examiner*—H. Grant Skaggs
*Attorney, Agent, or Firm*—Kenyon & Kenyon

[57] ABSTRACT

A triple seal valve member for an atomizing pump dispenser which includes an integrally molded plastic valve member having an outer portion terminating in a sealing tip for sealing against an axial outlet port, the outer part being of a first cross section; an inner part containing therein a hollow recess open at its inner end for accepting a biasing spring, the inner part of a larger cross section than the outer part, the radially outer portion of the inner part adapted to seal against an opening at the inner end of a pump chamber; an intermediate portion forming a generally cylindrical recess between the inner and outer portions, the recess in communication with the hollow recess in the inner portion; a narrowed throat formed at the area of communication between the hollow recess and the cylindrical recess; said intermediate portion having openings therein in the vicinity of its outer end permitting communication between the cylindrical recess and the area above the said inner portion; with a ball having a diameter which is less than the diameter of the cylindrical recess but greater than the diameter of the throat snapped into the cylindrical recess to thereby form therewith a check valve. Also disclosed is a pump using the valve member.

4 Claims, 3 Drawing Figures

TRIPLE SEAL VALVE MEMBER FOR AN ATOMIZING PUMP DISPENSER

BACKGROUND OF THE INVENTION

This invention relates to atomizing pump dispensers in general, and more particularly to an improved triple seal valve member particularly useful in a pre-pressurized type atomizing pump dispenser.

With the advent of restrictions against the use of fluorocarbons in atomizing dispensers and the concern for the effects of fluorocarbons on the ozone layer, the development of pumps which can atomize with the type of fine spray previously obtainable only with a pressurized container has become increasingly important.

The most common proposal for providing good atomizing in a pump comprises carrying out some type of a pre-pressurization. A number of different pre-pressurized pumps have been developed which include an outlet valve arrangement which does not operate until a certain amount of pressure builds up in a pump chamber so that a fine atomization without dribble can be accomplished. Typical of such pumps are the pumps described in U.S. Pat. No. 4,025,046; U.S. Pat. No. 3,399,836; U.S. Pat. No. 4,089,442 and French Pat. No. 2,249,716.

Each of the pumps disclosed in the aforementioned patents and patent applications include a pump chamber in which there is disposed, for reciprocal motion, a piston having a stem integral therewith. The piston contains a central axial bore at the inner end of which there is disposed a valve member which maintains an inlet port to that bore closed until pressure builds up in the pump chamber due to an inward depression of the pump stem. Each of the pumps also includes biasing means, typically a spring, which holds the valve member against the port until a sufficient differential pressure builds up to move it away from the inlet port. All of these pumps also include valving means at the inlet to the pump chamber. The purpose of the valving means is to permit refilling of the pump during an outward stroke, but to prevent backflow of the material from the pump chamber during a dispensing stroke. The most common manner of achieving the inlet valve is by means of a check valve. Thus, Pechstein, in U.S. Pat. No. 3,399,836, utilizes a ball check valve for this purpose. In French Pat. No. 2,249,716, the check valve is in the form of a rubber gasket disposed about an extension of the valve member and retained by a plastic cover. When the pump is operated, the pressure developed therein slides the gasket on the stem inward sealing against an opening at the inner end of the pump chamber. After dispensing, the pressure differential, due to the partial vacuum which is drawn inside the pump chamber, results in the gasket being moved upward to open a path for refilling.

In U.S. Pat. No. 4,089,442, a different type of check valve is utilized. The valve member which seals against the inlet port in the dispensing stem has a hollow portion which extends through a throat at the inner end of the pump chamber. Within this hollow section, a spring is disposed and the hollow section is placed in communication with the container. The hollow section is of a larger diameter than the rest of the valve member, being narrowed down at a point below the inlet port into the dispensing stem. This permits openings to be formed from the hollow side of the valve member. When pressure is developed in the chamber, it is pushed inward closing off the openings. When a differential pressure exists, it is pushed upward to permit fluid to flow through the hollow portion of the valve member, the openings and into the chamber. Another device using a conventional ball check is that of U.S. Pat. No. 4,051,983. In the embodiment disclosed therein, what is herein referred to as the valve member and which both acts to seal at the inner end of the pump chamber and to seal off the inlet port to the dispensing stem, is made of three pieces. There is an upper portion which extends into an opening in the piston and dispensing stem assembly to form, with the inlet port to the dispensing stem, a valve. This part has a hollow portion at its inner end. The hollow portion has a plurality of openings formed therein, and retains a ball. To hold the ball in place a third part is inserted into the hollow portion forming an extension of the valve member. This part carries out the necessary sealing at the inner end of the pump chamber.

The aforementioned U.S. Pat. No. 4,025,046, particularly in the embodiment shown in FIG. 4, dispense without the need for a separate inlet valve, using instead cooperation between the valve member and a throat formed at the inner end of the pump chamber. The valve member is constructed so that when the pump is in its at-rest position with the valve member, piston and dispensing stem all fully outward, the valve member, either by means of appropriate channels, tapering or sizing, opens up a path of communication between the container and the pump chamber. This was first disclosed and claimed in U.S. Pat. No. 4,113,145, granted to Philip Meshberg on Sept. 12, 1978, being an improvement on his earlier U.S. Pat. No. 3,211,346 granted Oct. 12, 1965.

Although this principle works quite well in most instances, particularly where the pump chambers are relatively small, or where a measured does is required, there are situations where it does not operate as well as might be desired. Most importantly, if the operator does not allow the stem to return to its fully outward position, i.e., where he executes short strokes, the inlet valve to the pump chamber will not open to allow it to refill. It must be noted that with such an arrangement the inlet to the pump chamber is not opened until the piston has almost reached its at-rest position. On the other hand, when using a conventional check valve, the pump chamber begins refilling almost immediately upon the beginning of the outward stroke. This allows short strokes. A problem can also occur if the operator, instead of releasing the dispensing stem all at once, lets it slowly come out. This permits leakage of air around the piston and improper refilling. Thus, despite the economic advantages of eliminating the need for a separate check valve, there are instances where the inclusion of a check valve is desirable. In particular, a ball check valve which is a proven type of check valve and has been used extensively is desirable. But, where a measured dose is required, of course, the full stroke is needed and a pump of the type disclosed is still preferred. Ideally the construction of such an arrangement should be such as to minimize additional cost. In other words, it is desirable to make such an arrangement with as few pieces as possible. It is also desirable that as many parts of a pump with and without a check valve be identical so that either pump can be supplied to a user with a minimum of effort.

SUMMARY OF THE INVENTION

It is the object of the present invention to provide an improved valve member for a pump of the general type described above which comprises a minimum number of pieces and which is easy to assemble. It is a further object of the present invention to provide a pump which includes such a valve.

These objects are achieved by the construction of the present invention. Starting with a pump of the general nature of that disclosed in the prior art, and which includes a valve member having an outer solid portion which projects into an opening below the piston and acts to close off an inlet port to the dispensing stem, and an inner larger section which is hollow on the inside and adapted to receive a biasing spring, in accordance with the present invention, this valve member is molded in one piece with a recess formed therein directly outward of the hollow area in the inner portion. The recess is narrowed to a throat at the point where it communicates with the hollowed area, with the throat of a diameter smaller than the rest of the recess and smaller than the diameter of a steel ball which is to be used as the ball check. The recess is maintained in communication with the pump chamber by means of openings which extend through the valve member. The valve member is made of a plastic material with sufficient resilience to permit snapping a ball into the recess. In this manner, the valve member, including a ball check valve, is made from only two pieces, a single piece plastic valve member and a, preferably, steel ball which is snapped therein. This greatly reduces manufacturing costs over the previously used three-piece assembly. Furthermore, with this simple assembly, the valve member operates as a triple seal valve member; the outer part of the valve member acts to seal against the inlet port to the dispensing stem, the inner part of the valve member seals against the throat at the inner end of the pump chamber and the ball check valve acts as a further seal during dispensing.

Furthermore, in accordance with the present invention, a valve member of this nature is used in combination with the flexible annular seal described in the aforementioned application. This gives improved sealing at the inlet of the pump chamber, while still permitting fast refilling by means of the ball check valve. The inner portion of the valve member which is hollowed out to receive a spring can be made so as to form an additional inlet valve of the type described in the aforementioned patent or may be manufactured so that it is always in sealing contact with the flexible annular seal.

DETAILED DESCRIPTION OF THE INVENTION

Figure 1:
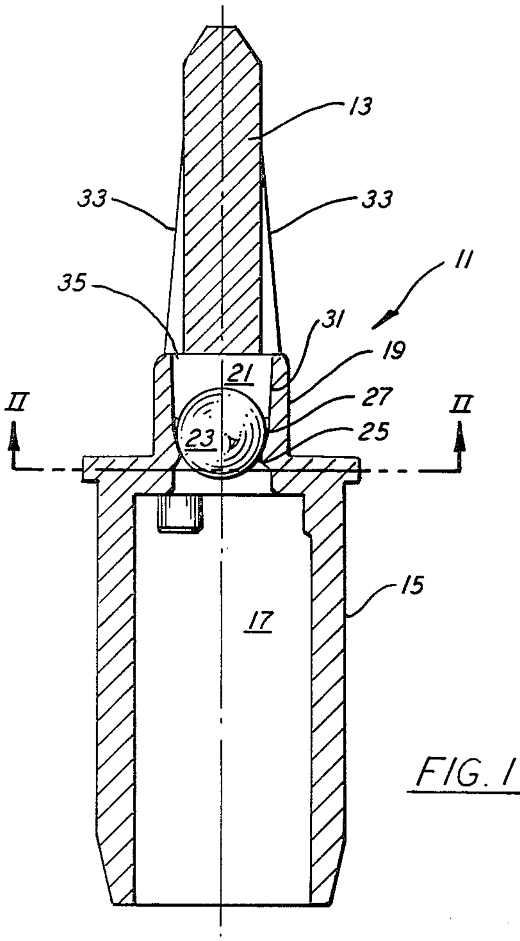
FIG. 1 is a cross-sectional view of the valve member of the present invention.
Figure 2:
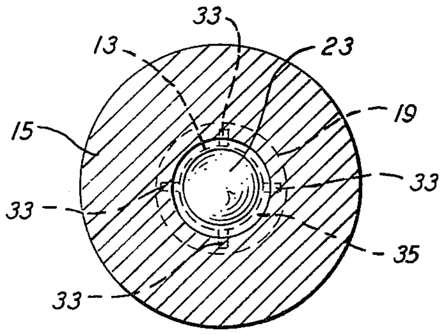
FIG. 2 is a cross section along the line II—II of FIG. 1.

FIG. 1 is a cross sectional view through the valve member of the present invention and FIG. 2 a view taken along the line II—II of the valve member of FIG. 1. The valve member 11 has an outer part 13 which is used for sealing an outlet port in a manner to be more fully described below, and an inner hollow part 15, having a hollow recess 17. Interposed between these two parts of the valve is an intermediate hollow generally-cylindrical portion 19 forming therein a recess 21 in which there is disposed a ball 23, preferably of steel. Recess 21 is in communication with the hollow portion 17 of the inner part 15 of the valve member 11, through a narrowed throat section 25. Extending outward from the narrowed throat area 25, is a tapered conical portion 27 terminating in a cylindrical portion 31. The outer part 13 of the valve member 11 is attached to the intermediate portion 19 by means of ribs 33. The valve member, except for the ball 23 is molded of plastic in a single piece. The ball is snapped into place from the inner end past the throat 25. In the position shown, which is its position during sealing, it rests against the tapered conical portion 27. The inside diameter of the portion 31 of the recess is larger than the outside diameter of the ball so that, under the influence of a differential pressure, it can move outward to permit fluid to flow therearound through openings 35 between the ribs 33 into a pump chamber in a manner to become more evident when discussing FIG. 3 below.

Figure 3:
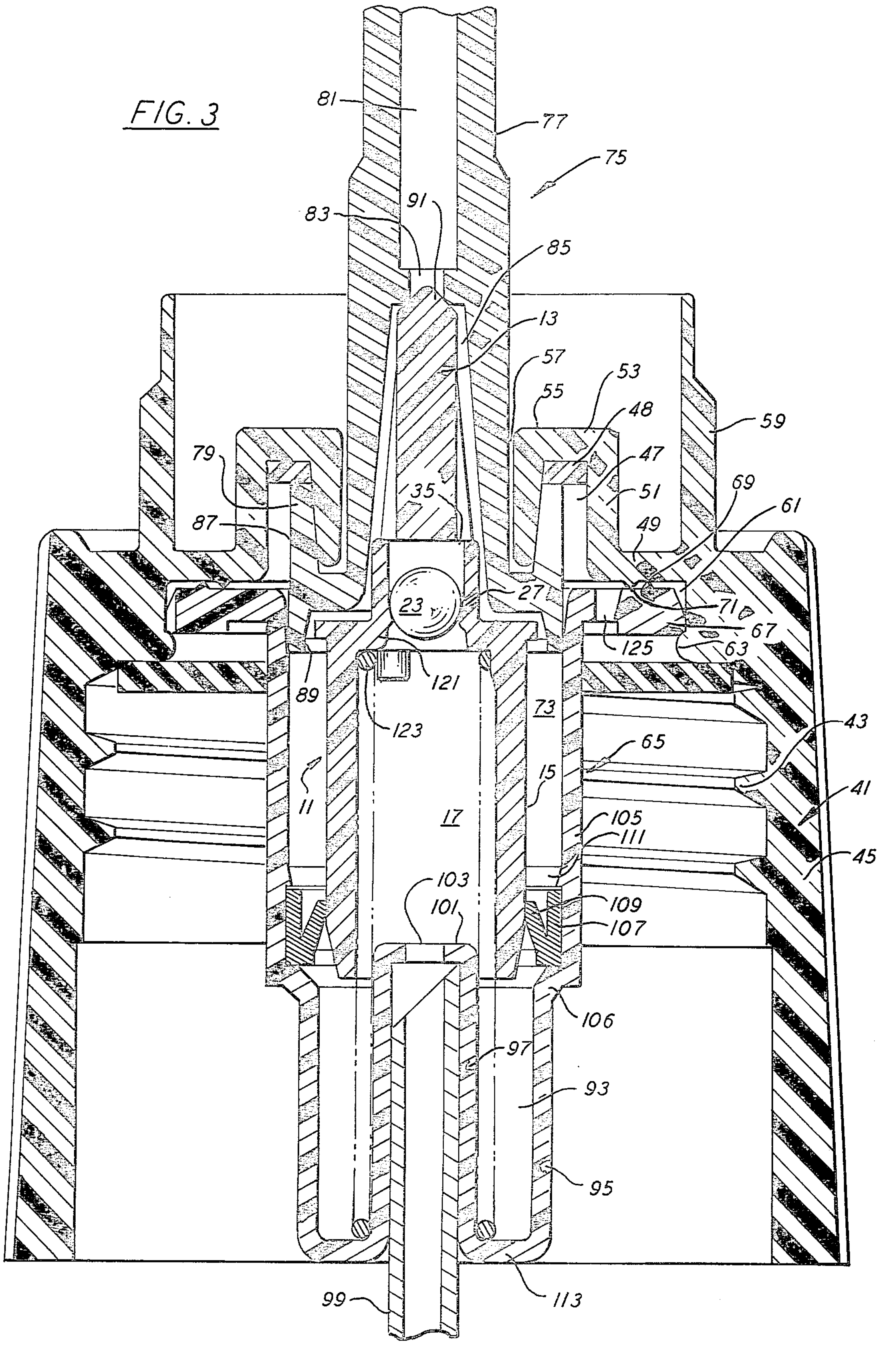
FIG. 3 is a cross-sectional view through a pump having installed therein the valve member of FIG. 1.

FIG. 3 illustrates a pump utilizing the valve member of the present invention. The particular pump illustrated on FIG. 3 is one adapted to screw onto a bottle and thus includes a cap portion 41 with internal threads 43 on the inside of a side wall 45 of cylindrical or slightly conical cross section. The types of pumps shown in the aforementioned application, which, instead of a cap, utilize a mounting cup for crimping to a bottle or can, can be equally well constructed using the valve member of the present invention. The pump of the present invention is installed within the cap 41. Extending from the side wall 45 which is cylindrical or slightly conical is a horizontal portion 49. This portion 49 continues as a vertical portion 51, a further horizontal portion 53, and a further vertical portion 55 depending downwardly or inwardly. Portions 51, 53 and 55 form an annular recess 47. The downwardly depending wall portion 55 also forms a central opening 57 in the cap. An additional vertical wall 59 projects outwardly from the horizontal portion 49 and can be used as a guide for an atomizer head. Formed below the wall 49 is an additional cylindrical recess 61. Projections 63 are molded directly below this recess. This permits snapping into the recess 61 a pump body 65 having at its upper or outer end a flange portion 67. The flange is snapped into place in the recess 61, past the projections 63. Both the flange 67 and the portion 49 are molded with annular projections 69 and 71, respectively, of a triangular cross section, to aid in sealing at this point. An annular gasket 48 is disposed in the outer part of the annular opening 47.

Within the pump chamber 73 of the pump body 65 is located a stem and piston assembly 75 having a stem portion 77 and a piston portion 79 at the inner end thereof. The stem 77 includes an outlet passage 81 which is supplied through an axial port 83. Directly inward of the port 83 is a hollow recess 85 of a shape capable of accepting the outer portion 13 of the valve member 11. The piston 79 is of a generally cylindrical shape having, with respect to the point of attachment to the stem, an upper cylindrical projection 87 and a lower cylindrical projection 89. The projecting portion 89 has a slight outward taper to make firm contact with the walls of the pump chamber 73. The valve member of FIG. 1 is also disposed in the pump chamber with the outer portion 13 thereof in the recess 85 with its conical tip 91 contacting and closing off port 83 when in the position shown. The pump body, in addition to the pump chamber, contains an annular chamber 93 therebelow. The annular chamber 93 has a radially outer wall 95 and a radially inner wall 97. The inner wall 97 is sized to accept a dip tube 99. A horizontal wall 101 with a port 103 is molded integrally with the wall 97. The outer wall 95 is of a smaller diameter than the wall 105 of the pump chamber 73. Thus, there is a stepped portion 107 between walls 101 and 95. Inside the pump chamber at this point is disposed a flexible annular seal 107. The seal is made of a material of a different hardness than the material from which the valve member 11 is made. Typically, it will be softer, although the reverse is possible. The seal 107 includes a portion 109 which projects axially outward and radially inward to contact the outside of the lower portion 15 of the valve member 11 to make sealing contact therewith. A projection 111 is formed on the inside wall of the pump chamber 73 to retain the flexible annular seal 107 in place. The annular chamber 93 also has an inner annular wall 113 joining the walls 97 and 95. Disposed between the wall 113 and outer end 121 of the hollow recess 17 of the valve member, at which point the lower portion 15 and intermediate portion 19 are joined, is a spring 123 which biases the valve member 11 outward. This outward biasing brings the conical tip into contact with the port 83 and at the same time biases the piston and stem assembly 75 axially outward into the position shown.

In the position shown, leakage of material out of the pump, even if the container to which it is attached is inverted, is prevented by means of the seal formed by the upper cylindrical part 87 of the piston with the gasket 47 and by the sealing edges 71 and 69. In operation, an actuator is typically placed over the end of the stem 77 and the stem depressed. Upon initial depression, presuming that the pump chamber 73 is filled, the piston causes a build up of pressure therein. This pressure acts against the ball 23 causing it to seal against the conical portion 27. Sealing at the inner end of the chamber 73 is maintained by means of flexible annular seal 101. The pressure builds up within the pump chamber 73. Because the size of the opening through which the inner portion 15 of valve member passes is greater than the size of the port 83, there is an overall differential in forces with a net inward force. This force must be sufficient to overcome the force of spring 123. When such occurs, the valve member 11 moves inward moving the conical portion 91 away from the port 83 and allowing dispensing to occur, but only after a predetermined pressure has been built up within the pump chamber. Dispensing continues until the piston moves fully inward.

At this point the operator normally releases the actuator and the force of the spring 123 pushes the valve member 11 and with it the stem and piston assembly 75 outward. This creates a partial vacuum within the chamber 73. The contents within the container will be acted upon by ambient air pressure, since, during the dispensing stroke, the container was vented by means of a gap between the circular opening 57 and the stem 77, through a hole 125 into the container. The resulting differential pressure acts on the ball 23 moving it outward so that a flow path through the dip tube 99, the hollow recess 17, past the ball 23, through the openings 35 and into the pump chamber 73 is established. Such refilling begins as soon as the outward stroke of the pump commences. Thus, even if movement is restrained by the operator, i.e., if he lets the stem move slowly or if there is slight deformation of the piston portion 89, refilling of the chamber 73 will occur. Further, the operator can execute short strokes with the pump partially refilling on each stroke.

What is claimed is:

1. In an atomizing dispensing pump comprising:

(a) means defining a pump chamber of substantially fixed volume having an inlet, said pump chamber having an opening at the inner end thereof;

(b) valving means disposed at said inlet for preventing a back flow from said pump chamber;

(c) a pump stem having a piston on the end thereof disposed for reciprocal motion in said pump chamber;

(d) said pump stem having a passageway therethrough with a dispensing outlet at the outer end of said passageway and an axial inlet port located inwardly thereof;

(e) a rigid valve member having an outer end portion cooperating with said axial inlet port to close off said port and an inner portion of a predetermined cross-sectional sealing area and of a length corresponding to the range of movement of said piston;

(f) an annular member forming a throat disposed at said opening at the inner end of said chamber, said inner portion of said valve member cooperating with said annular member to form means sealing the inner end of said pump chamber with a surface to surface seal at said throat, as said pump is operated by depressing said pump stem, to prevent any flow from said pump chamber through said throat when said pump is dispensing;

(g) detents formed on the inside of said pump body to retain said annular member in place.

(h) means for supplying liquid in a container to said valving means;

(i) means biasing said valve member outwardly so that the first end portion thereof closes off said inlet port, and thereby also biasing said pump stem outwardly;

(j) the cross-sectional area closed off at said inlet port being smaller than the cross-sectional area of said second end portion of said valve member at the point where it is sealingly guided, (k) said rigid valve member being;

(l) an integrally molded plastic having:

(i) said outer part terminating in a sealing tip for sealing against said inlet port, said outer part being of a first cross section;

(ii) said inner part containing therein a hollow recess open at its inner end for accepting said means biasing, said inner part being of a larger cross section than said outer part, the radially outer portion of said inner part adapted to seal against said annular member;

(iii) an intermediate portion forming a generally cylindrical recess between said inner and outer parts, said recess in communication with said hollow recess in said inner portion;

(iv) a narrowed throat formed at the area of communication between said hollow recess and said cylindrical recess;

(v) said intermediate portion having openings therein in the vicinity of its outer end permitting communication between said cylindrical recess and the area above said inner portion; and (vi) a ball having a diameter which is less than the diameter of said cylindrical recess but greater than the diameter of said throat snapped into said cylindrical recess to thereby form therewith a check valve, said valve member thereby forming the valving means at the inlet to said pump chamber.

2. The pump according to claim 1 wherein said ball is a steel ball.

3. The pump according to claim 1 wherein each of said outer, inner and intermediate portions are of a generally cylindrical shape and wherein the diameter of the cylindrical recess in said intermediate portion is greater than the diameter of said outer portion and wherein said outer portion and intermediate portion are connected by a plurality of ribs extending radially outward from said outer portion and attached to said intermediate portion at said inner end, the spaces between said ribs being open and forming the openings from said cylindrical recess to said area above said inner portion.

4. The pump according to claim 1 wherein said sealing tip comprises a conical sealing tip at the outer end of said outward portion.

* * * * *